(12) United States Patent  (10) Patent No.: US 7,418,258 B2
Moody et al.  (45) Date of Patent: Aug. 26, 2008

(54) SERVER-COORDINATED RINGTONES

(75) Inventors: Taryn Moody, Atlantic Highlands, NJ (US); Seligmann Doree Duncan, New York, NY (US)

(73) Assignee: Avaya Inc, Basking Ridge, NJ (US)

( * ) Notice: Subject to any disclaimer, the term of this patent is extended or adjusted under 35 U.S.C. 154(b) by 257 days.

(21) Appl. No.: 10/915,495

(22) Filed: Aug. 10, 2004

(65) Prior Publication Data

US 2006/0040646 A1   Feb. 23, 2006

(51) Int. Cl.
  *H04M 3/42* (2006.01)
  *H04M 3/00* (2006.01)
  *H04M 11/04* (2006.01)
  *H04Q 7/22* (2006.01)

(52) U.S. Cl. .............. 455/414.1; 455/416; 455/417; 379/47; 379/207.15; 379/373.01

(58) Field of Classification Search ...... 455/412.1–413, 455/414.1–416; 379/207.16, 373.01, 207.15, 379/47
See application file for complete search history.

(56) References Cited

U.S. PATENT DOCUMENTS

| | | | | |
|---|---|---|---|---|
| 5,371,781 | A * | 12/1994 | Ardon | .......................... 455/445 |
| 5,790,045 | A * | 8/1998 | Hymel et al. | ............... 340/7.58 |
| 6,904,359 | B2 * | 6/2005 | Jones | .......................... 701/204 |
| 6,999,731 | B2 * | 2/2006 | Cronin | .......................... 455/88 |
| 2002/0032020 | A1 | 3/2002 | Brown et al. | |
| 2003/0191807 | A1 * | 10/2003 | Olson | .......................... 709/206 |
| 2004/0067751 | A1 * | 4/2004 | Vandermeijden et al. | ........................ 455/414.1 |
| 2004/0204153 | A1 | 10/2004 | Benco | |
| 2005/0090234 | A1 * | 4/2005 | Ioku et al. | ................. 455/412.2 |
| 2005/0107128 | A1 * | 5/2005 | Deeds | .......................... 455/567 |
| 2005/0136976 | A1 * | 6/2005 | Shoemake | ................... 455/557 |
| 2005/0143103 | A1 * | 6/2005 | Bjorgan et al. | ............... 455/466 |

FOREIGN PATENT DOCUMENTS

| | | |
|---|---|---|
| EP | 0851649 A2 | 7/1988 |
| EP | 1255418 A2 | 11/2002 |
| JP | 2000-253111 A | 9/2000 |
| JP | 2001-007902 A | 1/2001 |
| JP | 2001-168952 A | 6/2001 |
| JP | 2001-274867 A | 10/2001 |
| JP | 2003-47043 A | 2/2003 |
| JP | 2003-69662 A | 3/2003 |
| JP | 2003-218999 A | 7/2003 |

* cited by examiner

*Primary Examiner*—William Trost
*Assistant Examiner*—Ariel Balaoing
(74) *Attorney, Agent, or Firm*—DeMont & Breyer, LLC

(57) ABSTRACT

An apparatus and methods are disclosed for enabling multiple telecommunications terminals that are associated with a common user to notify their user of the arrival of an incoming message via a ringtone, where the ringtone is: (i) coordinated across the terminals, and (ii) customized for each terminal based on one or more attributes of the terminal. In particular, in the illustrative embodiments a network infrastructure element (e.g., a switch, a wireless base station, a server, etc.) that receives a message directed to a telecommunications terminal sets the values of one or more properties of a ringtone (e.g., tempo, timbre, pitch, rhythm, etc.) based on one or more attributes of the telecommunications terminal (e.g., terminal type, etc.).

16 Claims, 12 Drawing Sheets

SERVER-COORDINATED RINGTONES

FIELD OF THE INVENTION

The present invention relates to telecommunications in general, and, more particularly, to techniques for intelligently notifying the user of a telecommunications terminal of the arrival of a message.

BACKGROUND OF THE INVENTION

FIG. 1 depicts telecommunications system 100 that comprises telecommunications terminals 105-$j$ (e.g., a wireless telephone, a laptop computer with softphone capability, etc.), for $j=1$ to 2, and network 120 (e.g., the Public Switched Telephone Network [PSTN], a cellular wireless network, a wireless local-area network, etc.) in the prior art. Telecommunications terminal 105-$j$ is capable of receiving messages (e.g., incoming voice call notifications, email messages, Short Message Service [SMS] messages, Multimedia Message Service [MMS] messages, Instant Messaging [IM] messages, etc.) that originate from other telecommunications terminals via network 120.

When telecommunications terminal 105-$j$ receives a message, it notifies its user of the message's arrival—or of the associated incoming call if one is occurring—by playing a "ringtone" (e.g., a tune, a series of beeps, etc.) via speaker 110-$j$; by displaying visual information (e.g., text, an image, etc.) via display 111-$j$ (if present); or by vibrating the terminal via vibration mechanism 112-$j$ (if present), alone or in combination. Telecommunications terminal 105-$j$ might play a particular ringtone for all incoming messages, or a ringtone that is associated with a category of callers (e.g., a ringtone for business contacts, a ringtone for friends, a ringtone for family members, etc.), or a ringtone that is associated with an individual caller, etc. Similarly, telecommunications terminals 105-1 and 105-2 might display a text message (e.g., "Incoming Call", "Incoming Call: Mom", "Incoming Call: 212-555-1234", etc.) or an image (e.g., an animated icon of a ringing telephone, a photo of the caller, etc.), or both, to indicate that there is an incoming message.

FIG. 2 depicts an illustrative block diagram of the salient components of network 120 in the prior art. As shown in FIG. 2, network 120 comprises a plurality of network infrastructure elements 201-$i$ for $i=1$ to 4, interconnected as shown. Each network infrastructure element 201-$i$ might be a switch, a private branch exchange (PBX), a wireless base station, a wireless switching center, a server, etc., depending on the type and topology of network 120. As will be understood by those skilled in the art, although all network infrastructure elements are denoted by the same prefix 201, element 201-1 might be a switch, while element 201-2 might be a wireless base station, etc. Similarly, the fact that network 120 has four elements 201 in FIG. 2 is merely illustrative; network 120 might have fewer elements or a greater number of elements than that depicted.

SUMMARY OF THE INVENTION

The present invention enables multiple telecommunications terminals that are associated with a common user to notify their user of the arrival of an incoming message via a ringtone, where the ringtone is: (i) coordinated across the terminals, and (ii) customized for each terminal based on one or more attributes of the terminal. In the illustrative embodiments, a network infrastructure element (e.g., a switch, a wireless base station, a server, etc.) receives a message directed to one or more telecommunications terminals that are associated with a user. For each of the telecommunications terminals to which the message is directed, the network infrastructure element sets the values of one or more properties of a ringtone (e.g., tempo, timbre, pitch, rhythm, etc.) to be played at the terminal based on one or more attributes of that particular terminal (e.g., terminal type, etc.). For example, if a user's three telecommunications terminals play the Beatles song "Hello Goodbye" when a message arrives that indicates an incoming call, the song might be played in a different fashion at each terminal, depending on the attributes of each terminal:

- as a piano version on the first terminal (a cellular phone), a harpsichord version on the second terminal (a softphone), and an orchestral version on the third terminal (a hardphone),
- using a lower octave on the first terminal, a middle octave on the second terminal, and an upper octave on the third terminal, or
- with lyrics sung in English on the first terminal, in German on the second terminal, and in Korean on the third terminal.

As another example, if the user selects a standard ring, the ring might have distinguishing tonality characteristics that are different on each terminal. As will be appreciated by those skilled in the art, modifying the values of properties such as timbre and pitch does not change the fundamental identity of the song or sound effect. In other words, the melody of the song is independent of these properties and thus the song remains recognizable.

In the first illustrative embodiment, when a network infrastructure element receives a message that is directed to one or more telecommunications terminals, the element transmits to each terminal a signal that represents an instance of a musical composition (e.g., an audio clip, a Musical Instrument Digital Interface [MIDI] file, etc.) along with the message. The values of one or more musical properties of the musical composition instance (e.g., tempo, volume, pitch, rhythm, etc.) are established based on one or more attributes of each telecommunications terminal (e.g., the terminal's type, the terminal's size, the terminal speaker's size, the terminal's ranking in terms of user preference, etc.) that is associated with a particular user. Subsequently, when each terminal receives the incoming message, the terminal plays a ringtone that comprises the instance of the musical composition that was received from the network infrastructure element.

In the second illustrative embodiment, the network infrastructure element determines musical property values (e.g., instrument is piano, first note is middle C, vocal language is Korean, etc.) based on one or more attributes of each telecommunications terminal that is associated with the particular user, and sends the property values, but not an instance of the musical composition, to each telecommunications terminal along with the message. Then, when each terminal receives the incoming message, it plays a ringtone that comprises the musical composition stored at the terminal in accordance with the received property values.

In both illustrative embodiments, when the user has selected a non-acoustic alert mode (e.g., visual, vibrational, etc.) on a first terminal, the other terminals associated with the user are updated to use alert modes that are consistent with that of the first terminal. For example, if a first terminal is put in a vibrational alert mode with its speaker muted, the other terminals' speakers are also muted and those terminals are put in a vibrational mode, a visual mode, or a combination of the two.

In some embodiments, the values of one or more musical properties of the instance of the musical composition; such as tempo, volume, pitch, rhythm, etc., are also established based on one or more attributes of the incoming message.

The illustrative embodiments of the present invention are advantageous over the prior art in that they provide a global mapping between incoming calls and ringtones such that the ringtones are distinguishable across multiple terminals. Each alerting terminal is clearly recognized, regardless of how many terminals are provided with the incoming call. At the same time, the fundamental identity—and, therefore, the meaning—of the ringtone is preserved across the user's terminals.

An illustrative embodiment comprises: (a) receiving a message directed to a user who is associated with a first telecommunications terminal and with a second telecommunications terminal; and (b) transmitting: (i) the message and a first signal that represents a first instance of a musical composition to the first telecommunications terminal, and (ii) the message and a second signal that represents a second instance of the musical composition to the second telecommunications terminal; wherein the first instance and the second instance are for notifying the user of the arrival of the message; and wherein the value of a first musical property of the first instance is based on an attribute of the first telecommunications terminal; and wherein the first musical property is independent of melody.

DETAILED DESCRIPTION

The terms appearing below are given the following definition for use in this Description and appended Claims.

For the purposes of the specification and claims, the term "musical composition" is defined as either a piece of music or a sound effect (e.g., one or more beeps, a combination of sounds, etc.). The musical composition constitutes a ringtone.

For the purposes of the specification and claims, the term "alert mode" is defined as the particular method of notifying a telecommunications terminal user of an incoming message or call. Methods include playing sounds through a speaker, displaying text or an image, flashing a light or icon, vibrating the terminal, etc. The alert mode can also define acceptable methods by indicating what will not be used for notifying (e.g., non-acoustic, etc.).

For purposes of the specification and claims, the term "mute status" is defined as the state of whether or not the speaker of a telecommunications terminal is turned off. If the speaker has been turned off for notifying a user of an incoming message, the mute status is "muted," while if the speaker is turned on for notifying a user of an incoming message, the mute status is "not muted."

In the illustrative embodiments described below, ringtone coordination is enabled across multiple terminals. One or more of the terminals associated with a user receive an incoming call notification message for the same call and play ringtones that all comprise the same musical composition, but with at least one property (e.g., timbre, etc.) that differs across the terminals. For example, a user with two terminals, such as those described below, might want to hear the "Batman" theme for any incoming call from the user's supervisor, but sounding like a piano at the first terminal because it is a cellular phone and like a harpsichord at the second terminal because it is a softphone.

Figure 3:
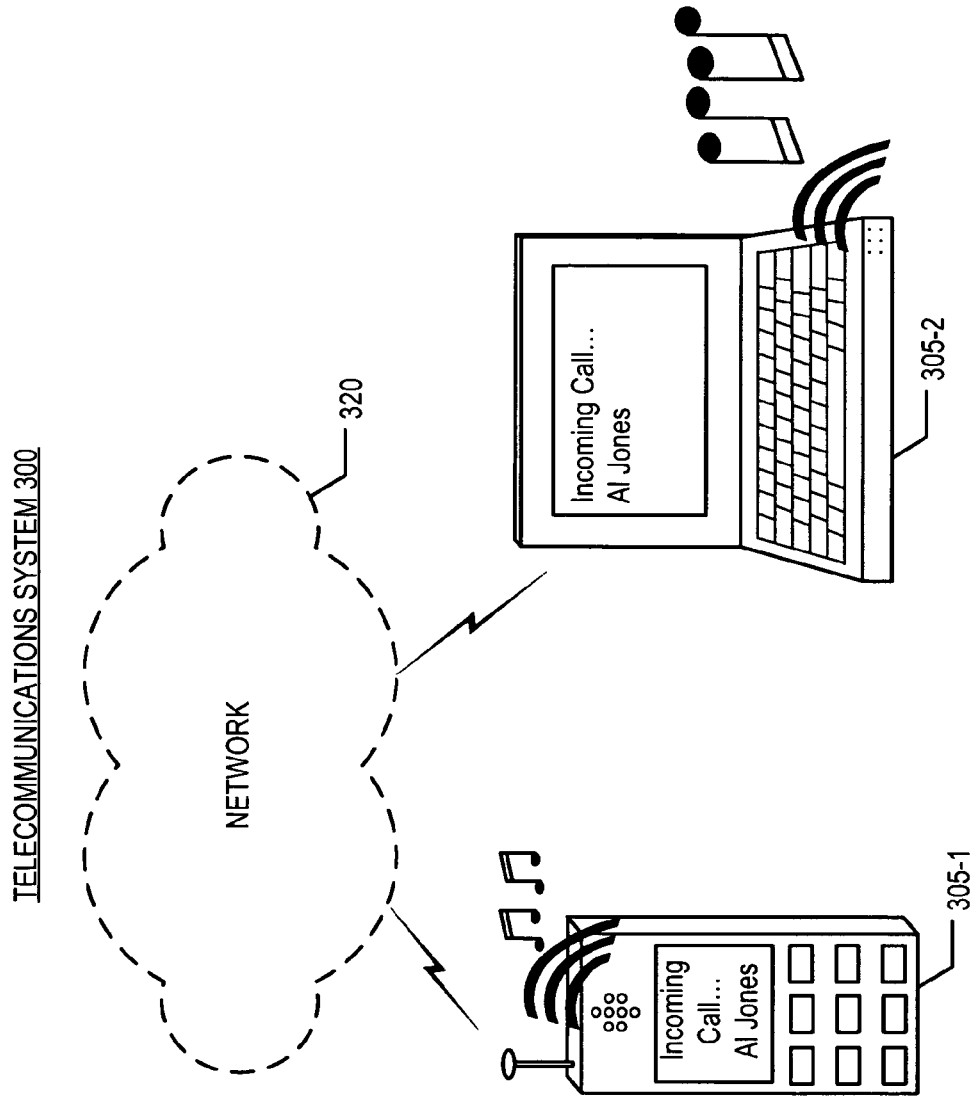
FIG. 3 depicts telecommunications system 300 in accordance with the illustrative embodiments of the present invention.

FIG. 3 depicts telecommunications system 300 in accordance with the illustrative embodiments of the present invention. Telecommunications system 300 comprises telecommunications terminals 305-1 and 305-2, and network 320, interrelated as shown.

Telecommunications terminal 305-$j$ (or "terminal 305-$jj$"), where j is equal to 1 or 2, is capable of receiving messages (e.g., voice telephone calls, email messages, Short Message Service [SMS] messages, etc.) from calling terminals via network 320. Terminal 305-$j$ is also capable of notifying its user of the arrival of a message as described below and with respect to FIGS. 9 and 12.

Each of terminals 305-1 and 305-2 is a different terminal type. For example as depicted in FIG. 3, terminal 305-1 is a cellular phone, and terminal 305-2 is a "softphone," as is known in the art, that is implemented in a laptop computer. It will be clear, however, to those skilled in the art, after reading this specification, how to make and use terminals 305-$j$ based on other terminal types that are well-known in the art (e.g., hardphone, Plain Old Telephone Service [or "POTS"] phone, Integrated Services Digital Network [or "ISDN"] phone, Private Branch Exchange [or "PBX"] phone, etc.). Furthermore, those who are skilled in the art will also appreciate that terminals 305-1 and 305-2 can be of the same terminal type.

Although two terminals (i.e., terminals 305-1 and 305-2) are depicted as part of the illustrative embodiments, it will be clear to those skilled in the art how to make and use telecommunications system 300 with more than two terminals present.

It will be clear to those skilled in the art, after reading this specification, how to make and use terminals 305-1 and 305-2.

Network 320 is a telecommunications network that transmits messages to and from telecommunications terminal 305-$j$ as described below and with respect to FIGS. 7, 8, 10, and 11. Telecommunications network 320 comprises one or more of the Internet, the Public Switched Telephone Network (PSTN), a local area network (LAN), a cellular network, etc., as are known in the art.

Figure 1:
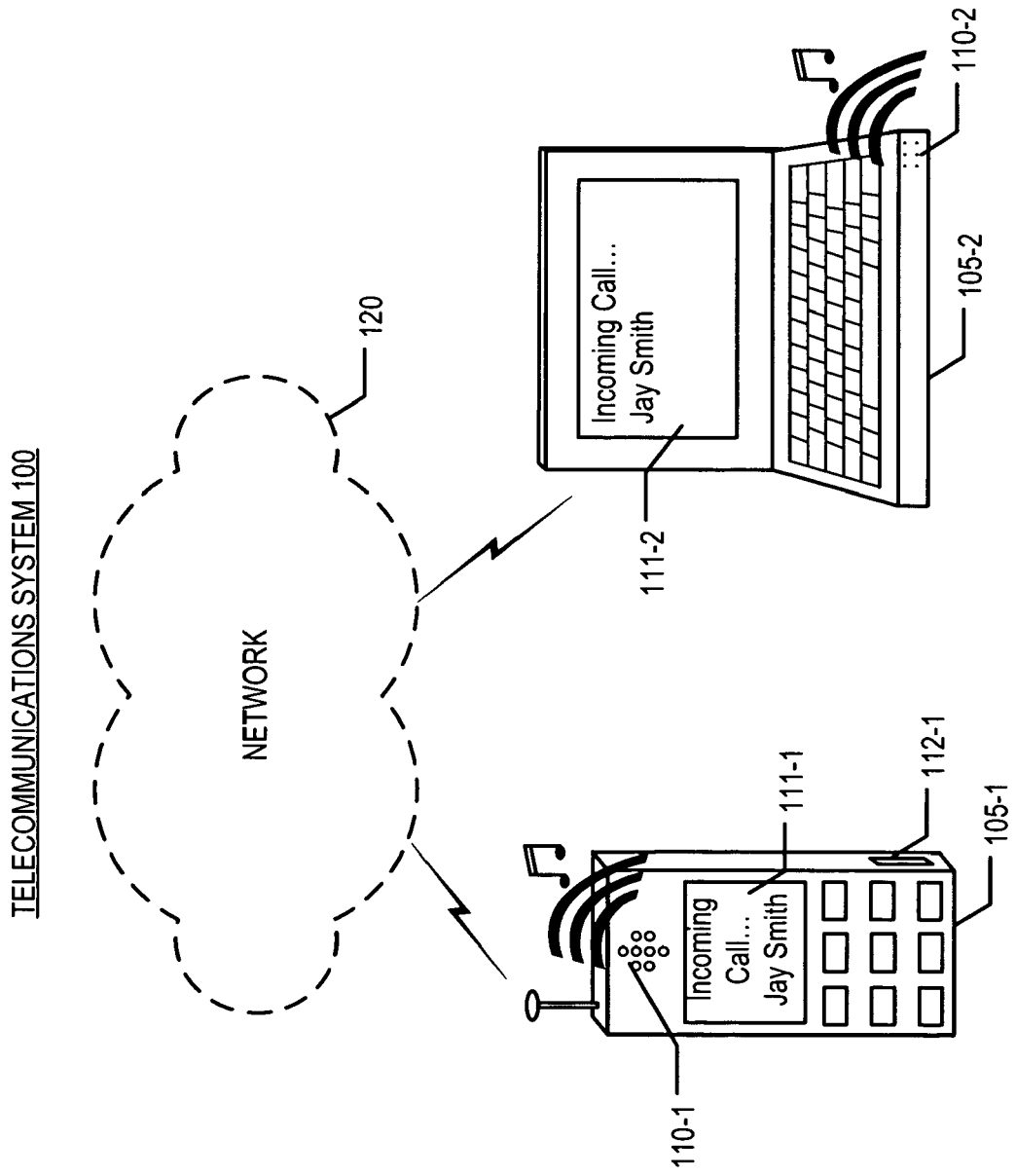
FIG. 1 depicts telecommunications system 100 in the prior art.
Figure 2:
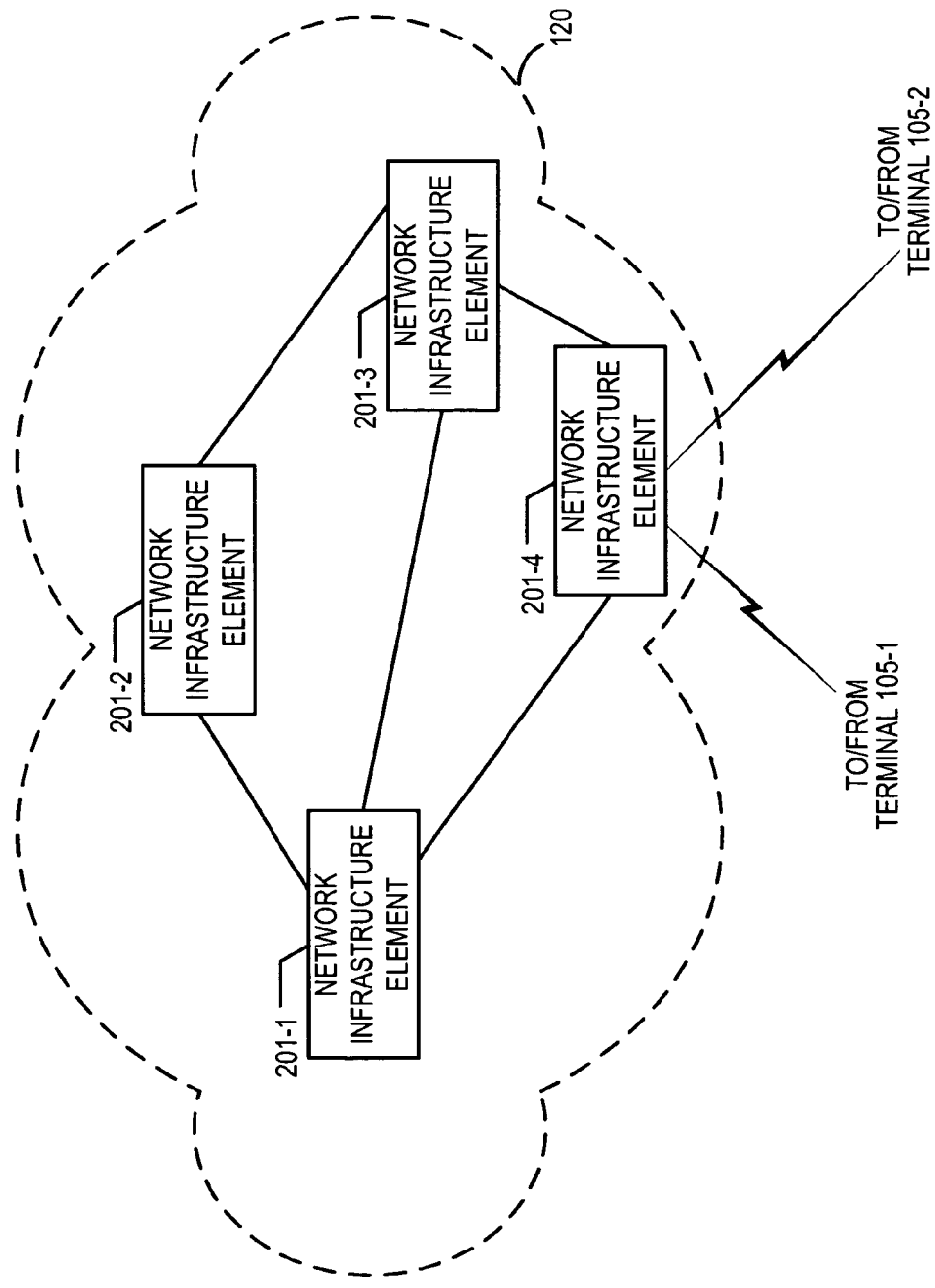
FIG. 2 depicts an illustrative block diagram of the salient components of network 120, as shown in FIG. 1, in the prior art.
Figure 4:
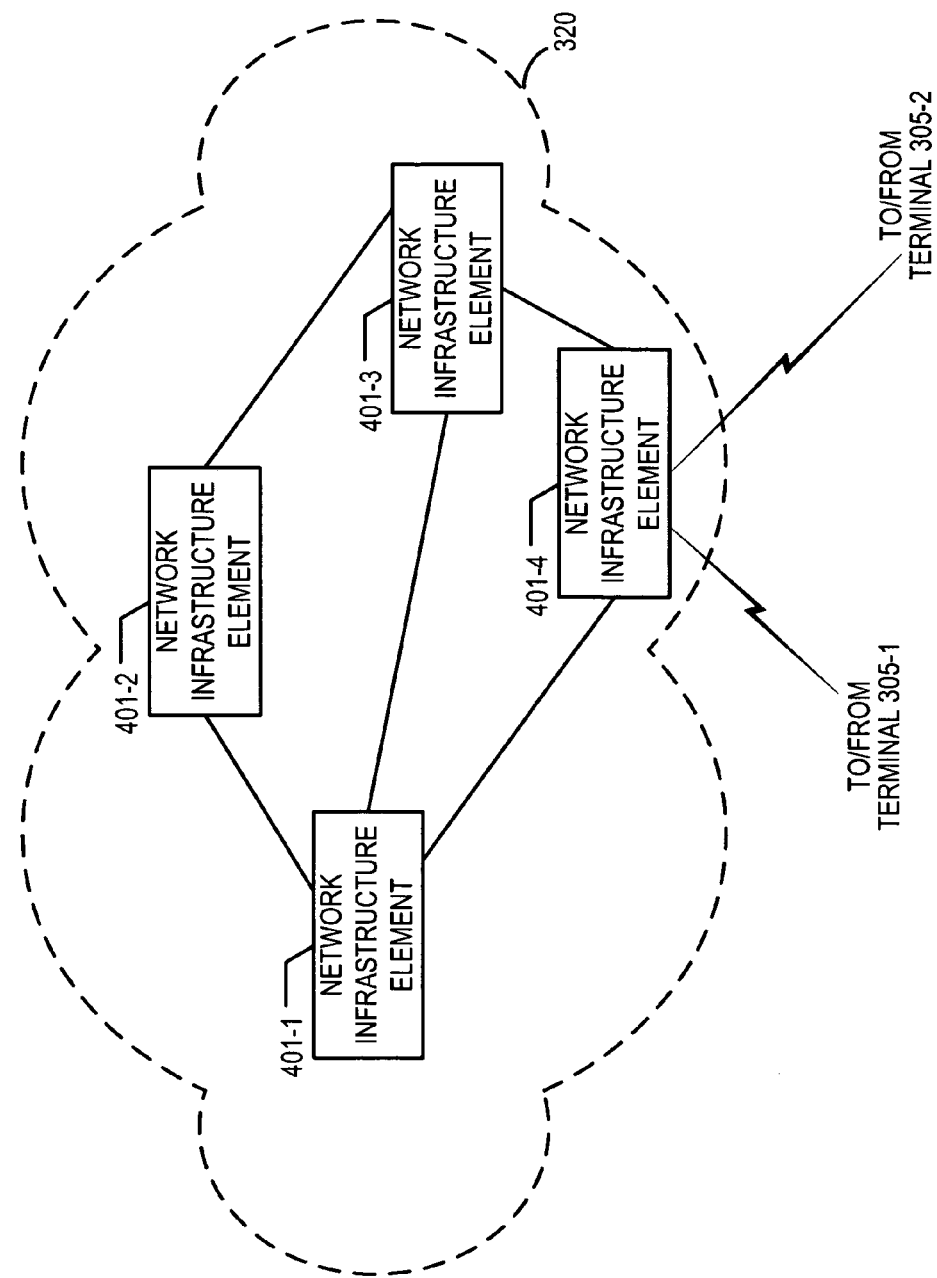
FIG. 4 depicts an illustrative block diagram of the salient components of network 320, as shown in FIG. 3, in accordance with the illustrative embodiments of the present invention.

FIG. 4 depicts an illustrative block diagram of the salient components of network 320 in accordance with the illustrative embodiments of the present invention. As shown in FIG. 4, network 320 comprises a plurality of network infrastructure elements 401-$i$ for i=1 to 4, interconnected as shown. Each network infrastructure element 401-$i$ (e.g., a switch, a private branch exchange [PBX], a wireless base station, a wireless switching center, a server, etc.) is capable of transmitting messages, as well as information related to notifying a user of those messages, to telecommunications terminal 305-$j$, as described below and with respect to FIGS. 7, 8, 10, and 11. Network infrastructure element 401-$i$ transmits the messages and information either directly or via one or more other network infrastructure elements 401, depending on the type of element it is. As in the case of FIG. 2, the fact that FIG. 4 depicts network 320 with four elements 401 is merely illustrative.

Network infrastructure element 401-$i$, as described later, coordinates across terminals 305-1 and 305-2 how a musical composition notifies the user of the incoming call. It will be clear to those skilled in the art, after reading this specification, how to make and use network infrastructure element 401-$i$.

Figure 5:
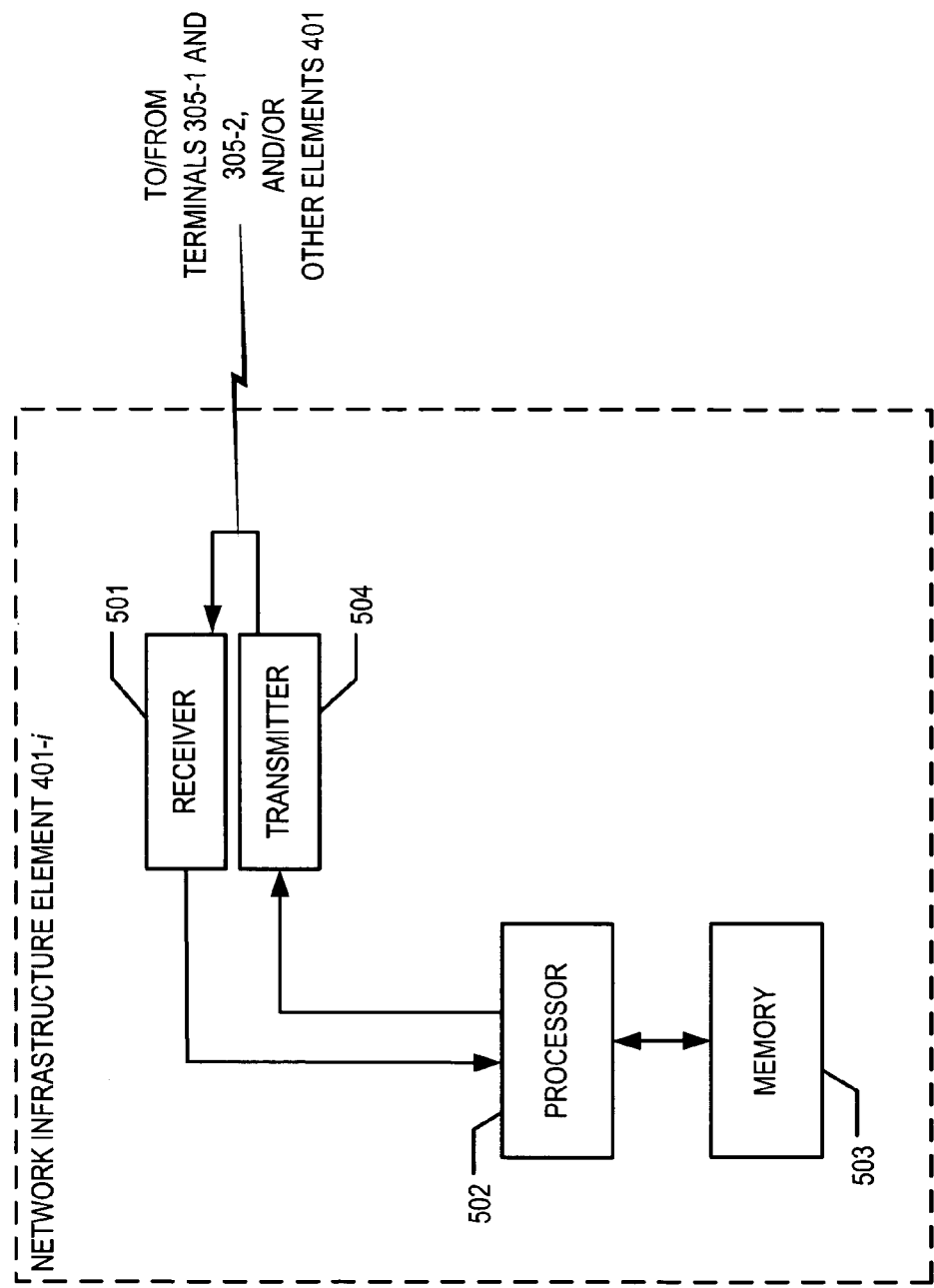
FIG. 5 depicts a block diagram of the salient components of network infrastructure element 401-$i$, as shown in FIG. 4, in accordance with the illustrative embodiments of the present invention.

FIG. 5 depicts a block diagram of the salient components of network infrastructure element 401-$i$ in accordance with the illustrative embodiments of the present invention. As shown in FIG. 5, network infrastructure element 401-$i$ comprises receiver 501, processor 502, memory 503, and transmitter 504, interconnected as shown.

Receiver 501 receives signals from one or more of terminal 305-1, terminal 305-2, and other elements 401, depending on the type of element that element 401-$i$ is, and forwards the information encoded in these signals to processor 502 in well-known fashion. In some embodiments, receiver 501 might comprise multiple units where each unit handles a different wireless or wireline telecommunications interface to elements outside of network infrastructure element 401-$i$. It will be clear to those skilled in the art, after reading this disclosure, how to make and use receiver 501.

Processor 502 is a general-purpose processor that is capable of reading data from and writing data into memory 503 and of executing the tasks described below and with respect to FIGS. 7, 8, 10, and 11. In some alternative embodiments of the present invention, processor 502 might be a special-purpose processor. In either case, it will be clear to those skilled in the art, after reading this disclosure, how to make and use processor 502.

Memory 503 stores data and executable instructions, as is well-known in the art, and might be any combination of random-access memory (RAM), flash memory, disk, drive, etc. It will be clear to those skilled in the art, after reading this specification, how to make and use memory 503.

Transmitter 504 receives information from processor 502 and transmits signals that encode this information to one or more of terminal 305-1, terminal 305-2, and other elements 401, depending on the type of element that element 401-$i$ is, in well-known fashion. In some embodiments, transmitter 504 comprises several units where each unit handles a different wireless or wireline telecommunications interface to elements outside of network infrastructure element 401-$i$. It will be clear to those skilled in the art, after reading this specification, how to make and use transmitter 504.

Figure 6:
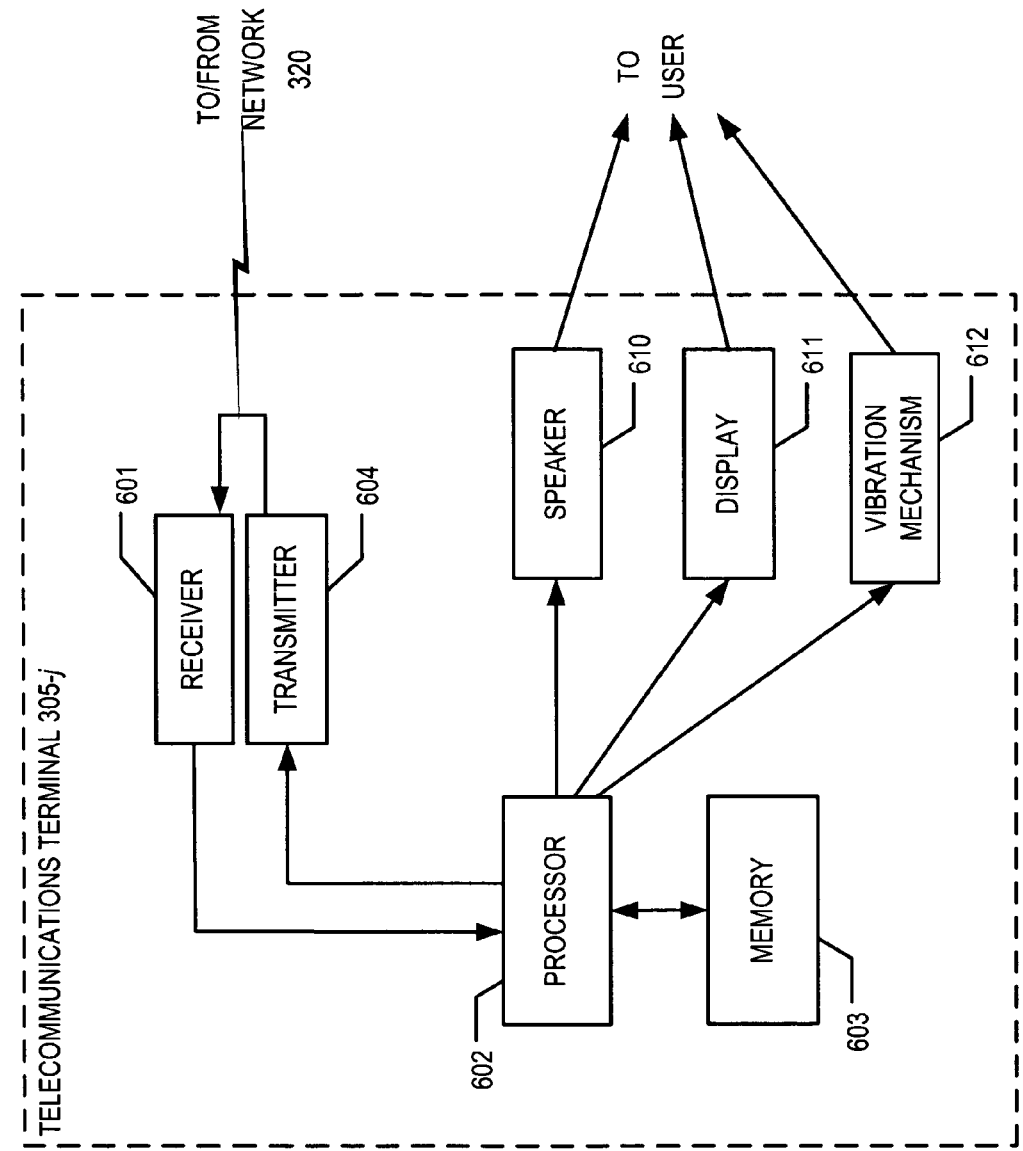
FIG. 6 depicts a block diagram of the salient components of telecommunications terminal 305-$j$, as shown in FIG. 3, in accordance with the illustrative embodiments of the present invention.

FIG. 6 depicts a block diagram of the salient components of terminal 305-$j$, in accordance with the illustrative embodiments of the present invention. As shown in FIG. 6, terminal 305-$j$ comprises receiver 601, processor 602, memory 603, transmitter 604, speaker 610, display 611, and vibration mechanism 612, interconnected as shown.

Receiver 601 receives signals from network 320 and forwards the information encoded in these signals to processor 602 in well-known fashion. It will be clear to those skilled in the art, after reading this disclosure, how to make and use receiver 601.

Processor 602 is a general-purpose processor that is capable of reading data from and writing data into memory 603, and of executing the tasks described below and with respect to FIGS. 9 and 12. In some alternative embodiments of the present invention, processor 602 might be a special-purpose processor. In either case, it will be clear to those skilled in the art, after reading this disclosure, how to make and use processor 602.

Memory 603 stores data and executable instructions, as is well-known in the art, and might be any combination of random-access memory (RAM), flash memory, disk, drive, etc. It will be clear to those skilled in the art, after reading this specification, how to make and use memory 603.

Transmitter 604 receives information from processor 602 and transmits signals that encode this information to network 320, in well-known fashion. It will be clear to those skilled in the art, after reading this specification, how to make and use transmitter 604.

Speaker 610, display 611, and vibration mechanism 612 are equivalent to speaker 110-1, display 111-1, and vibration mechanism 112-1, respectively, as are known in the art. In some alternative embodiments, display 611 or vibration mechanism 612 or both might not be present.

The remainder of this specification describes a first illustrative embodiment and a second illustrative embodiment of the present invention. The first illustrative embodiment performs ringtone coordination across more than one telecommunications terminal, in part by network infrastructure element 401-$i$ transmitting: (i) a first signal that represents a first instance of a musical composition to terminal 305-1, and (ii) a second signal that represents a second instance of the musical composition to terminal 305-2. The second illustrative embodiment also performs ringtone coordination across more than one telecommunications terminal, but does so in part by network 401-$i$ transmitting: (i) a first value of a musical property to terminal 305-1, and (ii) a second value of the musical property to terminal 305-2, where both terminals have previously stored the same musical composition.

Figure 7:
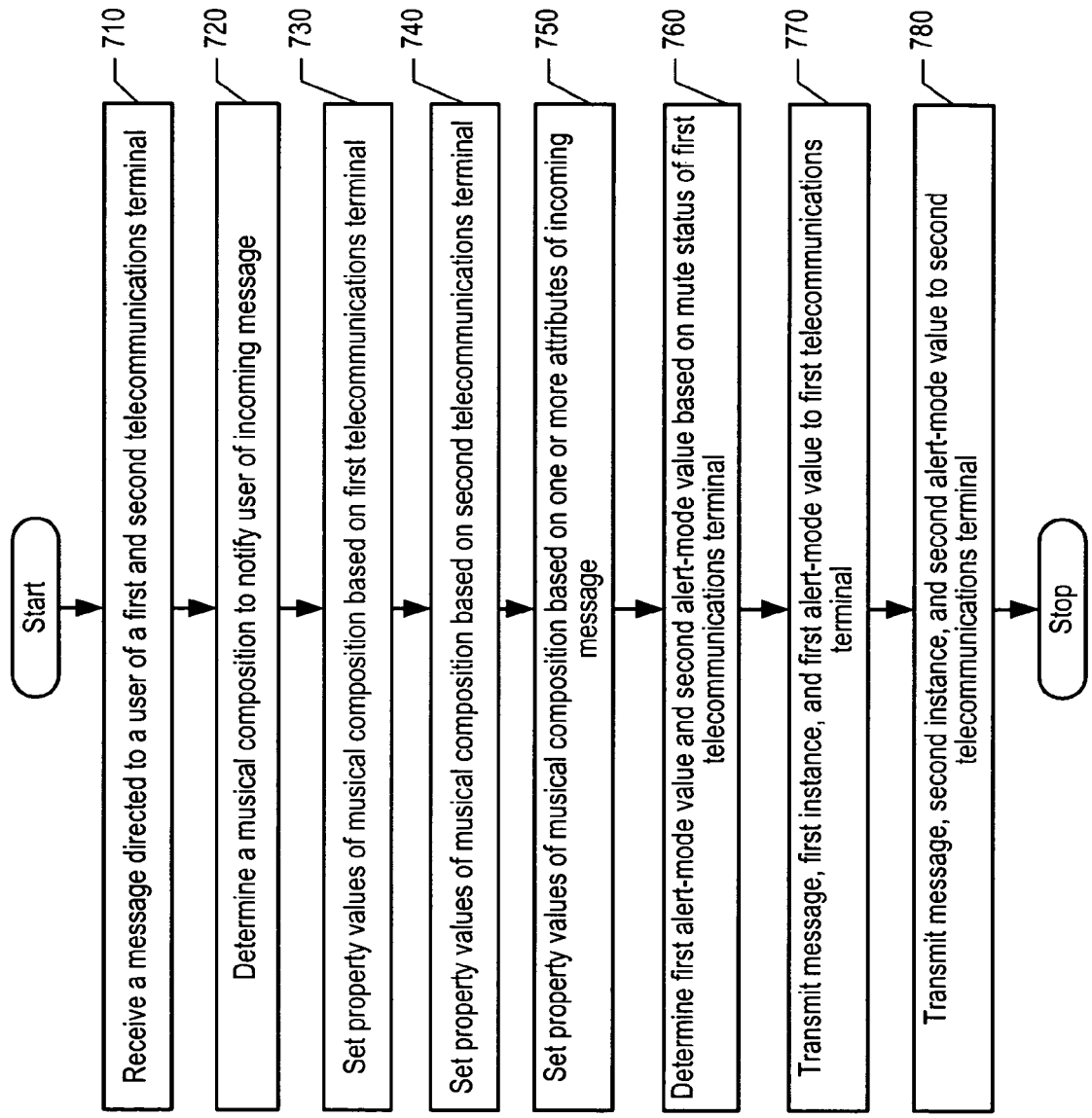
FIG. 7 depicts a flowchart of the salient tasks performed by network infrastructure element 401-$i$, in accordance with the first illustrative embodiment of the present invention.

FIG. 7 depicts a flowchart of the salient tasks performed by network infrastructure element 401-$i$, in accordance with the first illustrative embodiment of the present invention. For any given message sent to terminal 305-1 and 305-2—also referred to subsequently as the first telecommunications terminal and the second telecommunications terminal, respectively, the method of FIG. 7 need only be performed by one of the network infrastructure elements 401-$i$ in the path (that potentially consists of multiple hops) from the message sender to terminals 305-1 and 305-2. It will be clear to those skilled in the art which tasks depicted in FIG. 7 can be performed simultaneously or in a different order than that depicted.

At task 710, receiver 501 of network infrastructure element 401-*i* receives a message directed to terminals 305-1 and 305-2—as well as, effectively, to the common user of the two terminals—and forwards the message to processor 502, in well-known fashion.

At task 720, processor 502 determines what musical composition will be used to notify the user associated with terminals 305-1 and 305-2 of the arrival of the message. As will be appreciated by those skilled in the art, in some embodiments the "rules" that govern musical composition selection might be specified by the user who is associated with telecommunications terminals 305-1 and 305-2 and then uploaded to network infrastructure element 401-*i*, in well-known fashion. In some other embodiments, the calling terminal might piggyback a musical composition on outgoing messages. It will be clear to those skilled in the art how to select a musical composition.

At task 730, processor 502 sets the values of one or more properties of the musical composition that was determined at task 720, based on one or more attributes of terminal 305-1, as described in detail below and with respect to FIG. 8. These property values define a first instance of the musical composition. The properties selected are independent of melody.

At task 740, processor 502 sets the values of one or more properties of the musical composition that was determined at task 720, based on one or more attributes of terminal 305-2, as described in detail below and with respect to FIG. 8. These property values define a second instance of the musical composition. In some embodiments, the properties selected are the same as those selected at task 730.

At task 750, processor 502 sets the values of one or more properties of the musical composition that was determined at task 720, based on one or more attributes of the incoming message, as described in detail below and with respect to FIG. 8. These property values further define the first and second instances of the musical composition.

At task 760, processor 502 determines a first alert-mode value and a second alert-mode value. The first alert-mode value indicates the method by which terminal 305-1 notifies the user of an incoming call. The second alert-mode value indicates the method by which the second telecommunication terminal notifies the user of an incoming call. The method of notifying involves speaker 610, display 611, or vibration mechanism 612, or a combination of the three, in well-known fashion. Speaker 610 notifies the user by playing sound (e.g., a piece of music, a sound effect, etc.). Display 611 notifies the user by displaying a flashing icon, a flashing light, some other image, or text. Vibration mechanism 612 notifies the user through vibration.

Processor 502 determines the alert-mode values based on the mute status of terminal 305-1. Processor 502 receives the mute status from terminal 305-1 in well-known fashion. For example, when the user of terminal 305-1 selects to mute speaker 610 or to enable (i.e., "unmute") speaker 610, terminal 305-1 transmits the updated mute status to network infrastructure element 401-*i*, which updates processor 502. If the mute status is "muted," processor 502 sets the first alert-mode value and second alert-mode value to indicate that speaker 610 has been silenced. If the mute status is "not muted," processor 502 sets the first alert-mode value and second alert-mode value to indicate that speaker 610 is enabled. It will be clear to those skilled in the art that the first alert mode and second alert mode can indicate other alerting methods that will be used by terminals 305-1 and 305-2, where those other alerting methods are separate from or in addition to the alerting method that involves speaker 610.

At task 770, transmitter 504 transmits the incoming message, the first instance of the musical composition, and the first alert-mode value to terminal 305-1 in well-known fashion.

At task 780, transmitter 504 transmits the incoming message, the second instance of the musical composition, and the second alert-mode value to terminal 305-2 in well-known fashion. After task 780, the method of FIG. 7 terminates.

In some alternative embodiments, transmitter 504 transmits the incoming message to a subset (e.g., terminal 305-1 only, etc.) of the terminals that are associated with a user. It will be clear to those skilled in the art how to select which terminal or terminals receive the incoming message.

Figure 8:
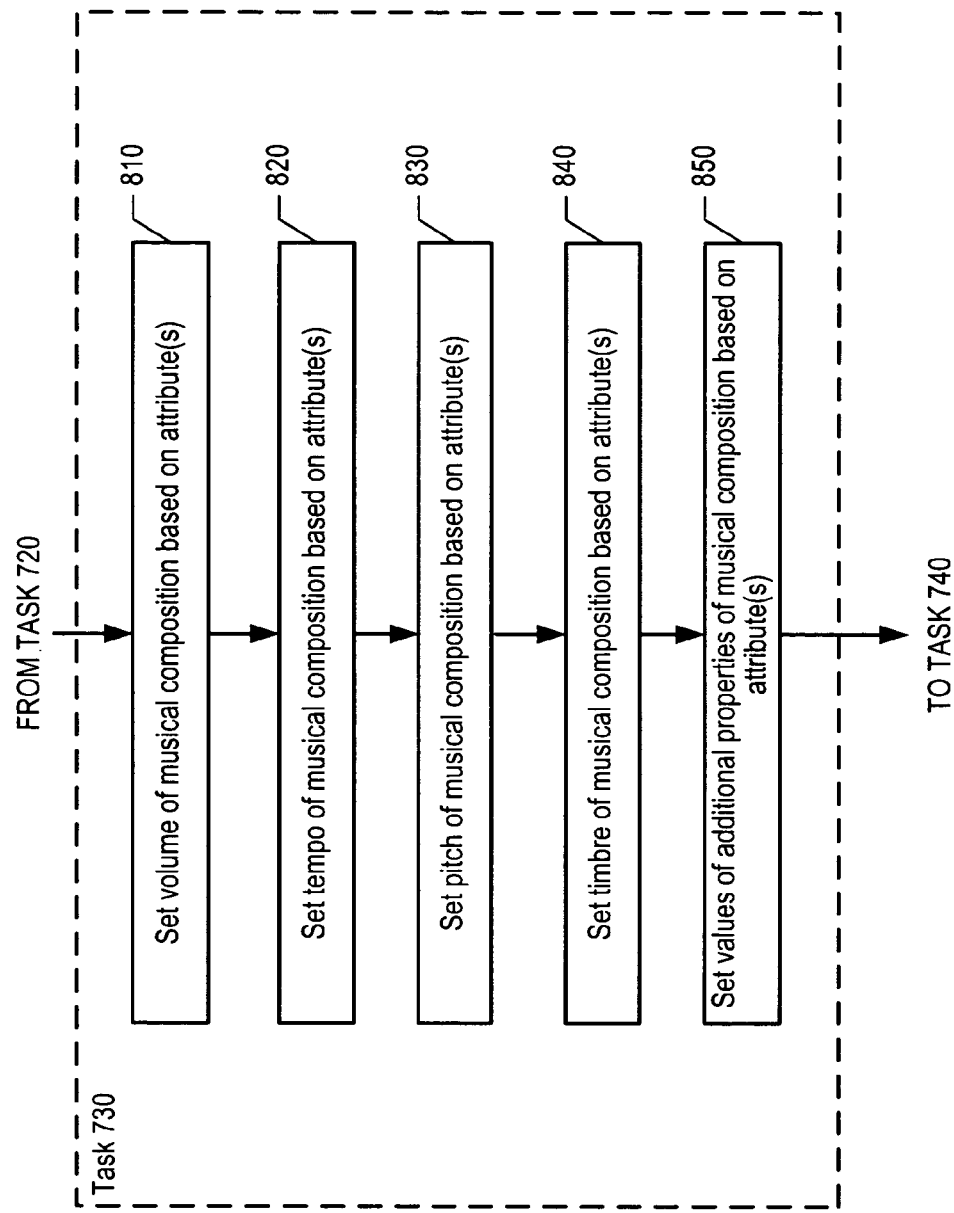
FIG. 8 depicts a detailed flowchart of task 730, as shown in FIG. 7, in accordance with the first illustrative embodiment of the present invention.

FIG. 8 depicts a detailed flowchart of task 730 in accordance with the first illustrative embodiment of the present invention. It will be clear to those skilled in the art which tasks depicted in FIG. 8 can be performed simultaneously or in a different order than that depicted.

At task 810, processor 502 sets the volume that will be used by terminal 305-1 in playing the selected musical composition, based on one or more attributes (e.g., terminal type, etc.) of terminal 305-1.

At task 820, processor 502 sets the tempo of the musical composition for terminal 305-1, based on one or more attributes of terminal 305-1.

At task 830, processor 502 sets the pitch (i.e., key signature) of the musical composition for terminal 305-1, based on one or more attributes of terminal 305-1.

At task 840, processor 502 sets the timbre (e.g., the musical instrument playing the composition, vocal versus instrumental composition, etc.) of the musical composition for terminal 305-1, based on one or more attributes of terminal 305-1.

At task 850, processor 502 sets the values of additional properties of the musical composition (e.g., harmony, rhythm, gender for vocal music, language for vocal music, etc.) for terminal 305-1, based on one or more attributes of terminal 305-1. After task 850, execution continues at task 740.

The tasks depicted in FIG. 8 also apply to task 740, except that one or more attributes of terminal 305-2 are considered. For example, processor 502 sets the volume that will be used by terminal 305-2 in playing the selected musical composition, based on one or more attributes (e.g., terminal type, etc.) of terminal 305-2.

The tasks depicted in FIG. 8 also apply to task 750, except that one or more attributes of the incoming message are considered. For example, processor 502 sets the volume of the musical composition based on one or more attributes of the message such as the identity of the sender of the message, a priority associated with the message, the location from which the message was sent, etc. As will be appreciated by those skilled in the art, setting volume based on the location from which the message was sent is possible only in telecommunications systems that provide such information to terminals.

Figure 9:
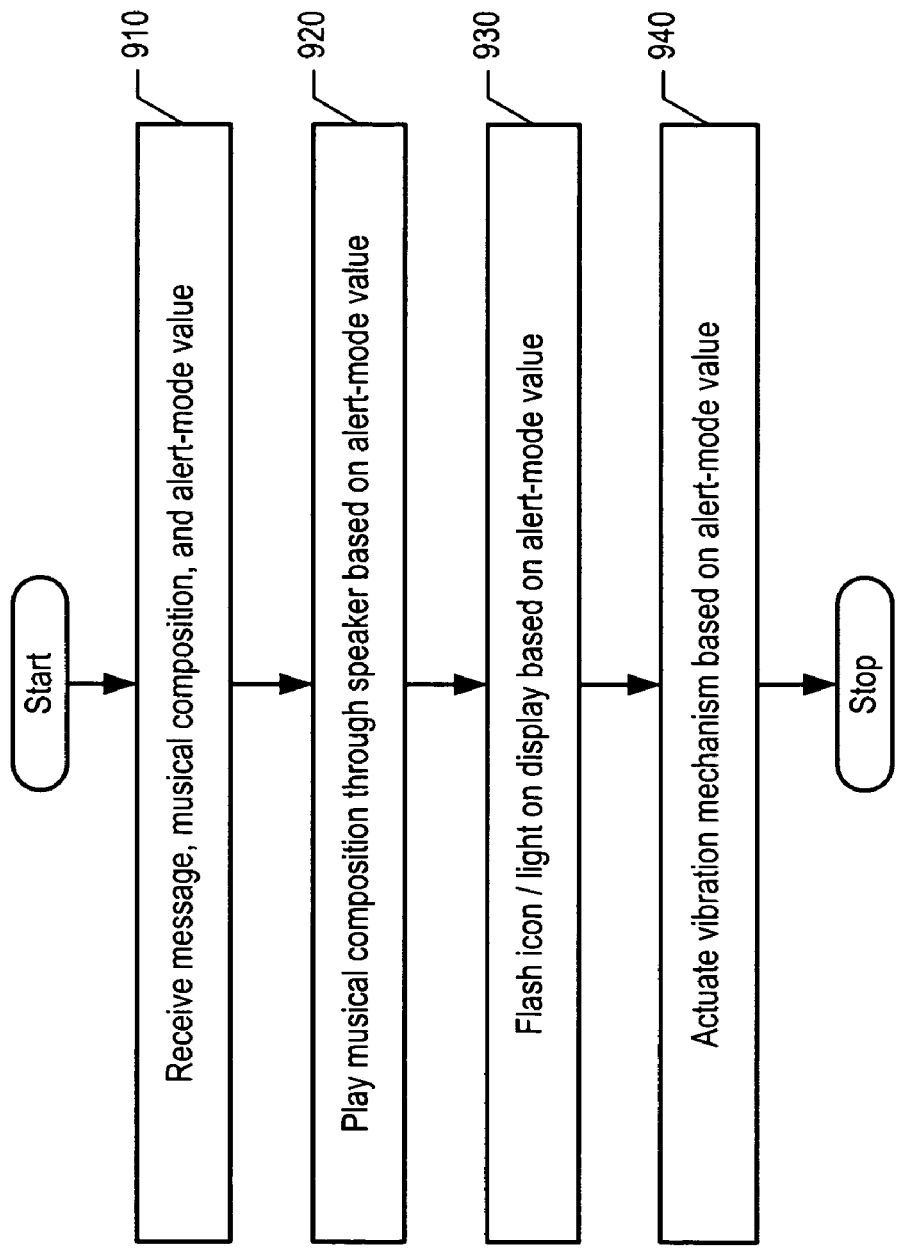
FIG. 9 depicts a flowchart of the salient tasks performed by telecommunications terminal 305-$j$, in accordance with the first illustrative embodiment of the present invention.

FIG. 9 depicts a flowchart of the salient tasks of terminal 305-*j*, for j=1 to 2, in accordance with the first illustrative embodiment of the present invention. It will be clear to those skilled in the art which tasks depicted in FIG. 9 can be performed simultaneously or in a different order than that depicted.

At task 910, receiver 601 of terminal 305-*j* receives the message, the j$^{th}$ instance of the musical composition, and the j$^{th}$ alert-mode value from network infrastructure element 401-*i* in well-known fashion.

At task 920, processor 602 of terminal 305-*j* sends a signal to speaker 610 to play the musical composition, provided that the alert-mode value indicates that the speaker is enabled.

At task 930, processor 602 of terminal 305-*j* sends a signal to display 611 to visually indicate the incoming message, provided that the alert-mode value indicates to do so.

At task 940, processor 602 of terminal 305-*j* sends a signal that actuates vibration mechanism 612, provided that the alert-mode value indicates to do so. After task 940, the method of FIG. 9 terminates.

Figure 10:
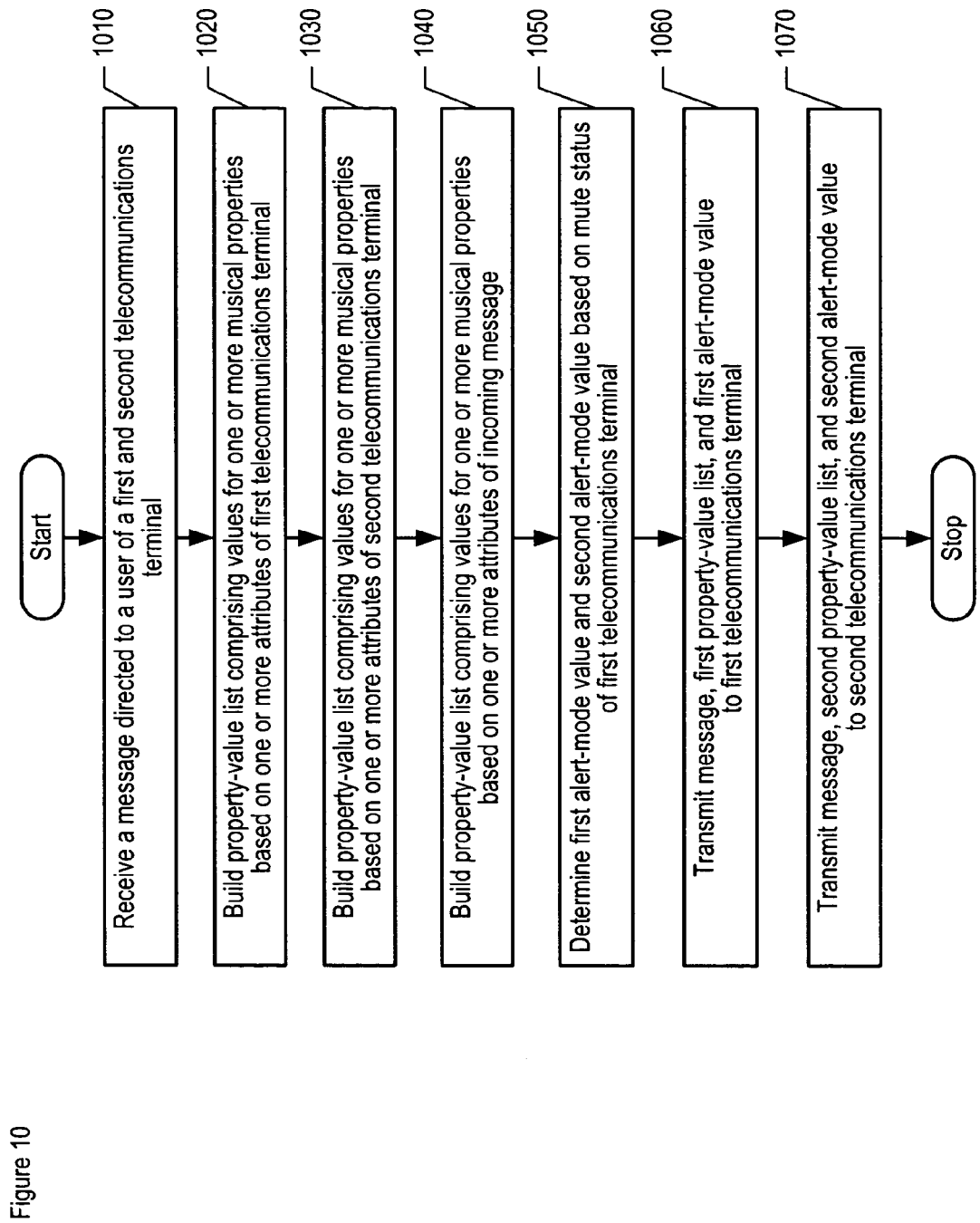
FIG. 10 depicts a flowchart of the salient tasks performed by network infrastructure element 401-$i$, in accordance with the second illustrative embodiment of the present invention.

FIG. 10 depicts a flowchart of the salient tasks performed by network infrastructure element 401-*i*, in accordance with the second illustrative embodiment of the present invention. In the second illustrative embodiment, network infrastructure element 401-*i* determines the property values for the musical composition, instead of building the musical composition itself. Terminals 305-1 and 305-2 then use the property values to determine how to play the musical composition, which is stored locally in terminals 305-1 and 305-2.

For any given message sent to terminal 305-1 and 305-2- also referred to subsequently as the first telecommunications terminal and second telecommunications terminal, respectively, the method of FIG. 10 need only be performed by one of the network infrastructure elements 401-*i* in the path (that potentially consists of multiple hops) from the message sender to terminals 305-1 and 305-2. It will be clear to those skilled in the art which tasks depicted in FIG. 10 can be performed simultaneously or in a different order than that depicted.

At task 1010, receiver 501 of network infrastructure element 401-*i* receives a message directed to terminals 305-1 and 305-2—as well as, effectively, to the common user of the two terminals—and forwards the message to processor 502, in well-known fashion.

At task 1020, processor 502 builds a first property-value list that comprises values for one or more musical properties based on one or more attributes of terminal 305-1, as described in detail below and with respect to FIG. 11. The properties selected are independent of melody.

At task 1030, processor 502 builds a second property-value list that comprises values for one or more musical properties based on one or more attributes of terminal 305-2, as described in detail below and with respect to FIG. 11. In some embodiments, the properties selected are the same as those selected at task 1020.

At task 1040, processor 502 amends the first and second property-value lists, based on one or more attributes of the incoming message, as described in detail below and with respect to FIG. 11.

At task 1050, processor 502 determines a first alert-mode value and a second alert-mode value. The first alert-mode value indicates the method by which terminal 305-1 notifies the user of an incoming call. The second alert-mode value indicates the method by which the second telecommunication terminal notifies the user of an incoming call. The method of notifying involves speaker 610, display 611, or vibration mechanism 612, or a combination of the three, in well-known fashion. Speaker 610 notifies the user by playing sound (e.g., a piece of music, a sound effect, etc.). Display 611 notifies the user by displaying a flashing icon, a flashing light, some other image, or text. Vibration mechanism 612 notifies the user through vibration.

Processor 502 determines the alert-mode values based on the mute status of terminal 305-1. Processor 502 receives the mute status from terminal 305-1 in well-known fashion. For example, when the user of terminal 305-1 selects to mute speaker 610 or to enable (i.e., "unmute") speaker 610, terminal 305-1 transmits the updated mute status to network infrastructure element 401-*i*, which updates processor 502. If the mute status is "muted," processor 502 sets the first alert-mode value and second alert-mode value to indicate that speaker 610 has been silenced. If the mute status is "not muted," processor 502 sets the first alert-mode value and second alert-mode value to indicate that speaker 610 is enabled. It will be clear to those skilled in the art that the first alert mode and second alert mode can indicate other alerting methods that will be used by terminals 305-1 and 305-2, where those other alerting methods are separate from or in addition to the alerting method involving speaker 610.

At task 1060, transmitter 504 transmits the incoming message, the first property-value list, and the first alert-mode value to terminal 305-1 in well-known fashion.

At task 1070, transmitter 504 transmits the incoming message, the second property-value list, and the second alert-mode value to terminal 305-2 in well-known fashion. After task 1070, the method of FIG. 10 terminates.

In some alternative embodiments, transmitter 504 transmits the incoming message to a subset (e.g., terminal 305-1 only, etc.) of the terminals that are associated with a user. It will be clear to those skilled in the art how to select which terminal or terminals receive the incoming message.

Figure 11:
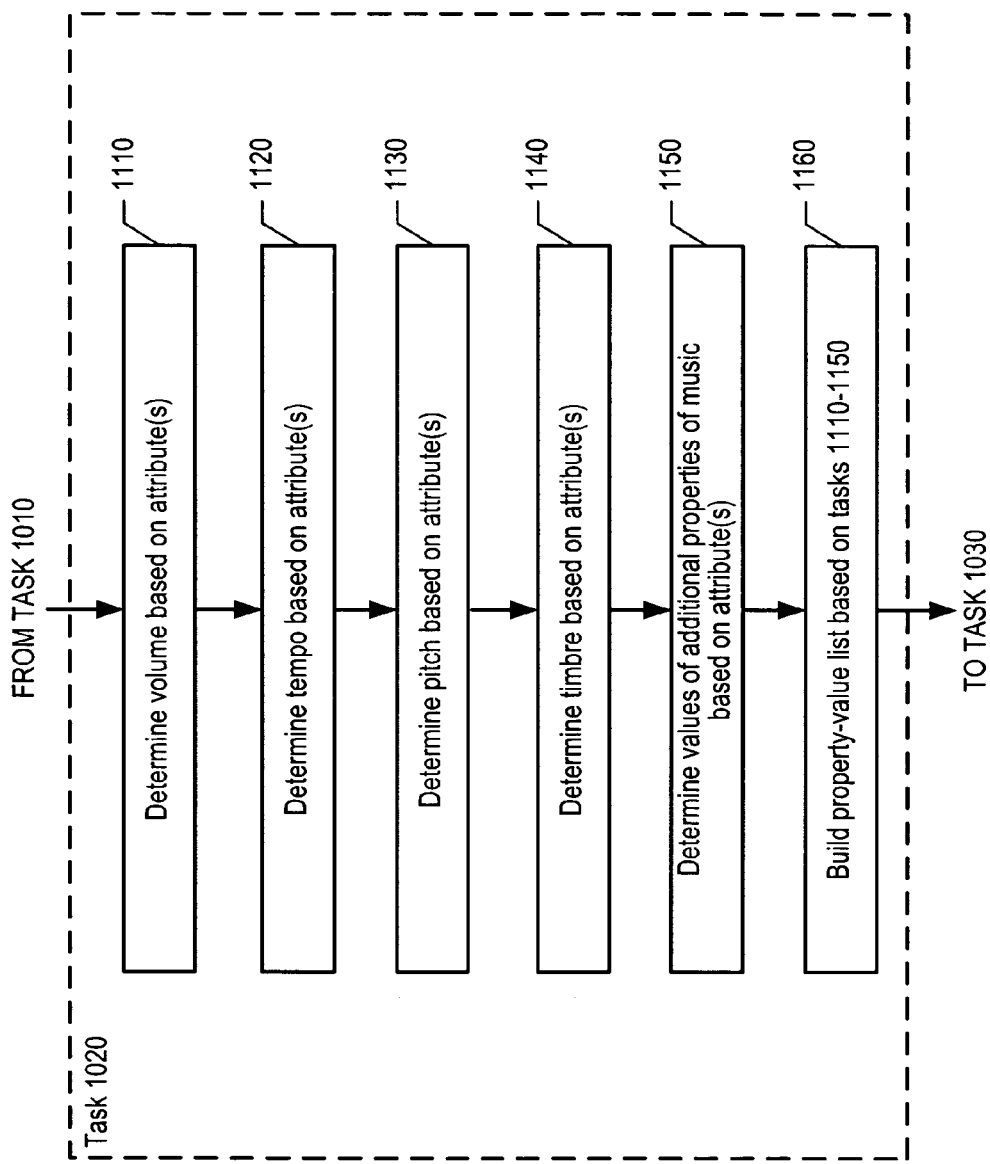
FIG. 11 depicts a detailed flowchart of task 1020, as shown in FIG. 10, in accordance with the second illustrative embodiment of the present invention.

FIG. 11 depicts a detailed flowchart of task 1020 in accordance with the second illustrative embodiment of the present invention. It will be clear to those skilled in the art which tasks depicted in FIG. 11 can be performed simultaneously or in a different order than that depicted.

At task 1110, processor 502 determines the volume that will be used by terminal 305-1 in playing the locally-stored musical composition, based on one or more attributes (e.g., terminal type, etc.) of terminal 305-1.

At task 1120, processor 502 determines the tempo of the musical composition for terminal 305-1, based on one or more attributes of terminal 305-1.

At task 1130, processor 502 determines the pitch (i.e., key signature) of the musical composition for terminal 305-1, based on one or more attributes of terminal 305-1.

At task 1140, processor 502 determines the timbre (e.g., the musical instrument playing the composition, vocal versus instrumental composition, etc.) of the musical composition for terminal 305-1, based on one or more attributes of terminal 305-1.

At task 1150, processor 502 determines the values of additional properties of the musical composition (e.g., harmony, rhythm, gender for vocal music, language for vocal music, etc.) for terminal 305-1, based on one or more attributes of terminal 305-1.

At task 1160, processor 502 builds a first property-value list based on tasks 1110 through 1150. After task 1160, execution continues at task 1030.

The tasks depicted in FIG. 11 also apply to task 1030, except that one or more attributes of terminal 305-2 are considered in building a second property-value list. For example, processor 502 determines the volume that will be used by terminal 305-2 in playing the locally-stored musical composition, based on one or more attributes (e.g., terminal type, etc.) of terminal 305-2.

The tasks depicted in FIG. 11 also apply to task 1040, except that one or more attributes of the incoming message are considered in amending the first and second property-value lists. For example, processor 502 determines the volume of the musical composition based on one or more attributes of the message such as the identity of the sender of the message, a priority associated with the message, the location from which the message was sent, etc. As will be appreciated by those skilled in the art, setting volume based on the location from which the message was sent is possible only in telecommunications systems that provide such information to terminals.

Figure 12:
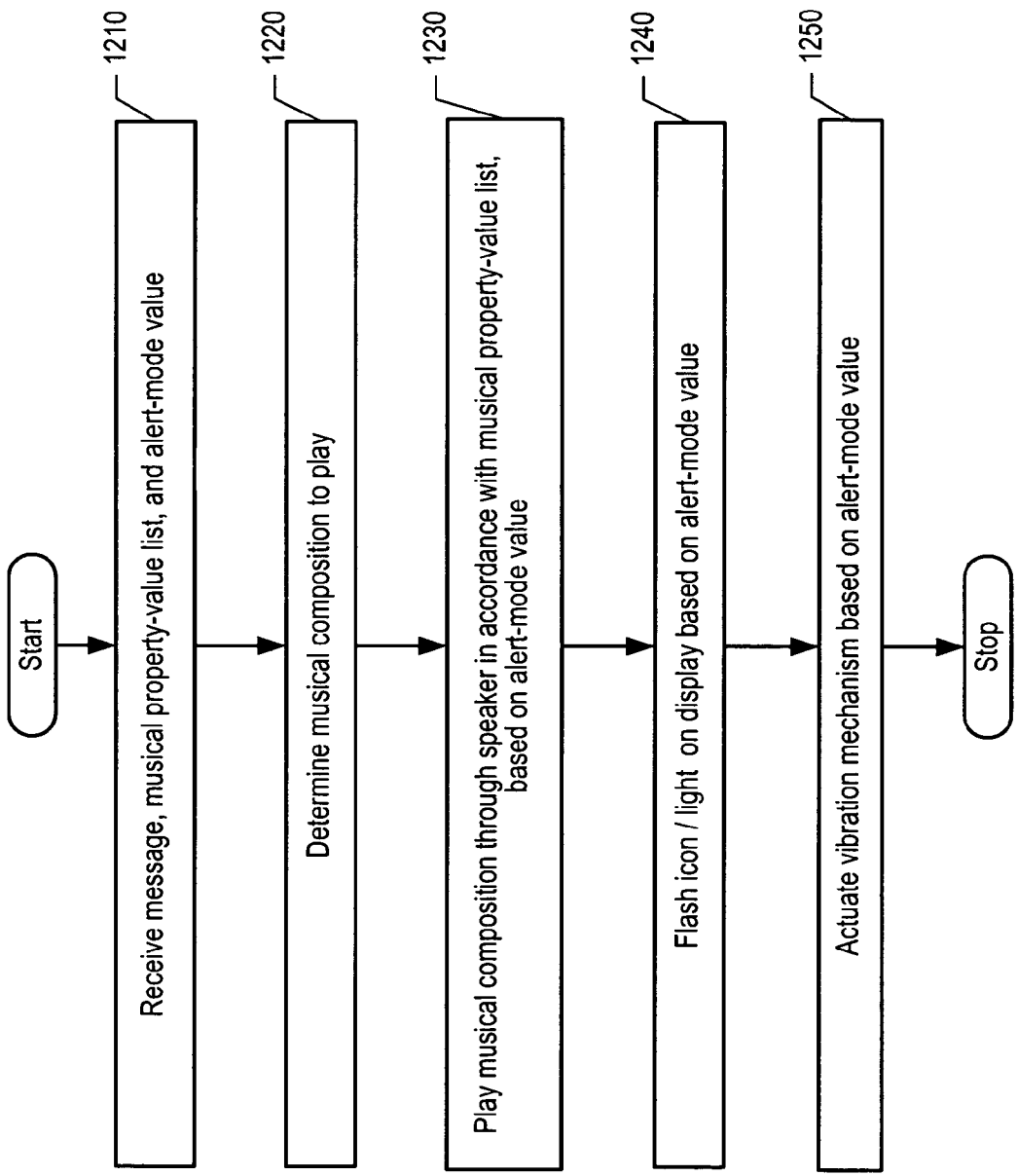
FIG. 12 depicts a flowchart of the salient tasks performed by telecommunications terminal 305-$j$, in accordance with the second illustrative embodiment of the present invention.

FIG. 12 depicts a flowchart of the salient tasks of terminal 305-j, for j=1 to 2, in accordance with the second illustrative embodiment of the present invention. It will be clear to those skilled in the art which tasks depicted in FIG. 12 can be performed simultaneously or in a different order than that depicted.

At task 1210, receiver 601 of terminal 305-j receives the message, the $j^{th}$ property value list, and the $j^{th}$ alert-mode value from network infrastructure element 401-i in well-known fashion.

At task 1220, processor 602 of terminal 305-j determines what musical composition to play for notifying the user of the arrival of the message, in well-known fashion. In accordance with the second illustrative embodiment of the present invention, terminals 305-1 and 305-2 select the same musical composition because both terminals use the same method for determining the musical composition, which has been stored previously in both terminals (e.g., provisioned at the factory, downloaded by the user or an administrator, etc.).

At task 1230, processor 602 of terminal 305-j sends a signal to speaker 610 to play the musical composition, provided that the alert-mode value indicates that the speaker is enabled. Processor 602 generates, in well-known fashion, the signal so that the musical composition plays in accordance with the musical property-value list received at task 1210.

At task 1240, terminal 305-j sends a signal to display 611 to visually indicate the incoming message, provided that the alert-mode value indicates to do so.

At task 1250, terminal 305-j sends a signal that actuates vibration mechanism 612, provided that the alert-mode value indicates to do so. After task 1250, the method of FIG. 12 terminates.

It is to be understood that the above-described embodiments are merely illustrative of the present invention and that many variations of the above-described embodiments can be devised by those skilled in the art without departing from the scope of the invention. For example, in this Specification, numerous specific details are provided in order to provide a thorough description and understanding of the illustrative embodiments of the present invention. Those skilled in the art will recognize, however, that the invention can be practiced without one or more of those details, or with other methods, materials, components, etc.

Furthermore, in some instances, well-known structures, materials, or operations are not shown or described in detail to avoid obscuring aspects of the illustrative embodiments. It is understood that the various embodiments shown in the Figures are illustrative, and are not necessarily drawn to scale. Reference throughout the specification to "one embodiment" or "an embodiment" or "some embodiments" means that a particular feature, structure, material, or characteristic described in connection with the embodiment(s) is included in at least one embodiment of the present invention, but not necessarily all embodiments. Consequently, the appearances of the phrase "in one embodiment," "in an embodiment," or "in some embodiments" in various places throughout the Specification are not necessarily all referring to the same embodiment. Furthermore, the particular features, structures, materials, or characteristics can be combined in any suitable manner in one or more embodiments. It is therefore intended that such variations be included within the scope of the following claims and their equivalents.

What is claimed is:

1. A method comprising:
   (a) receiving a message directed to a user who is associated with a first telecommunications terminal and with a second telecommunications terminal; and
   (b) transmitting:
      (i) said message and a first signal that represents a first instance of a predetermined musical composition to said first telecommunications terminal, said predetermined musical composition being characterized by a melody, and
      (ii) said message and a second signal that represents a second instance of said predetermined musical composition to said second telecommunications terminal;
   wherein said first instance and said second instance are for notifying said user of the arrival of said message; and
   wherein a first value of a first musical property defines said first instance and is based on an attribute of said first telecommunications terminal;
   wherein a second value of said first musical property defines said second instance and is based on an attribute of said second telecommunications terminal; and
   wherein said first musical property is independent of said melody.

2. The method of claim 1 wherein the value of a second musical property of said second instance is based on an attribute of said second telecommunications terminal, and wherein said first musical property and said second musical property are different.

3. The method of claim 1 wherein the value of a second musical property of said first instance is based on an attribute of said message.

4. The method of claim 1 wherein said first musical property is one of pitch, timbre, harmony and rhythm.

5. The method of claim 1 wherein said first musical property is one of volume, tempo, and dynamic range.

6. The method of claim 1 wherein said first musical property is for vocal music and is one of gender and language.

7. The method of claim 1 wherein said first signal is one of an audio clip and a Musical Instrument Digital Interface file.

8. The method of claim 1 wherein said attribute of said first telecommunications terminal is terminal type, and wherein said terminal type is one of cellular phone, POTS phone, ISDN phone, and PBX phone.

9. The method of claim 1 wherein said attribute of said first telecommunications terminal is terminal type, and wherein said terminal type is one of hardphone and softphone.

10. A method comprising:
    (a) receiving a message directed to a user who is associated with a first telecommunications terminal and with a second telecommunications terminal;
    (b) determining:
       (i) a first value of a first musical property, wherein said first value is based on an attribute of said first telecommunications terminal, and wherein said first value indicates that said first telecommunications terminal is to play a predetermined musical composition in a first fashion, said predetermined musical composition being characterized by a melody, and
       (ii) a second value of said first musical property, wherein said second value is based on an attribute of said second telecommunications terminal, and wherein said second value indicates that said second telecommunications terminal is to play said predetermined musical composition in a second fashion; and (c) transmitting:
  (i) said message and said first value of said first musical property to said first telecommunications terminal, and
  (ii) said message and said second value of said first musical property to said second telecommunications terminal;
wherein said first musical property is independent of said melody.

11. The method of claim 10 further comprising:
(d) determining a third value of a second musical property, wherein said third value is based on an attribute of said message; and
(e) transmitting said third value of said second musical property to said first telecommunications terminal.

12. The method of claim 10 wherein said first musical property is one of pitch, timbre, harmony and rhythm.

13. The method of claim 10 wherein said first musical property is one of volume, tempo, and dynamic range.

14. The method of claim 10 wherein said first musical property is for vocal music and is one of gender and language.

15. The method of claim 10 wherein said attribute of said first telecommunications terminal is terminal type, and wherein said terminal type is one of cellular phone, POTS phone, ISDN phone, and PBX phone.

16. The method of claim 10 wherein said attribute of said first telecommunications terminal is terminal type, and wherein said terminal type is one of hardphone and softphone.

* * * * *